US008924701B2

(12) United States Patent
Jung et al.

(10) Patent No.: US 8,924,701 B2
(45) Date of Patent: Dec. 30, 2014

(54) APPARATUS AND METHOD FOR GENERATING A BOOT IMAGE THAT IS ADJUSTABLE IN SIZE BY SELECTING PROCESSES ACCORDING TO AN OPTIMIZATION LEVEL TO BE WRITTEN TO THE BOOT IMAGE

(75) Inventors: Myung-June Jung, Suwon (KR); Geun-Sik Lim, Hwaseong (KR); Sang-Bum Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 403 days.

(21) Appl. No.: 13/178,029

(22) Filed: Jul. 7, 2011

(65) Prior Publication Data
US 2012/0089825 A1    Apr. 12, 2012

(30) Foreign Application Priority Data
Oct. 7, 2010   (KR) .................. 10-2010-0097956

(51) Int. Cl.
G06F 9/00       (2006.01)
G06F 15/177     (2006.01)
G06F 9/44       (2006.01)

(52) U.S. Cl.
CPC .................. *G06F 9/4418* (2013.01)
USPC ............................................. 713/2

(58) Field of Classification Search
CPC .................................. G06F 9/4401
USPC ............................................. 713/2
See application file for complete search history.

(56) References Cited

U.S. PATENT DOCUMENTS

| | | | |
|---|---|---|---|
| 6,173,417 B1 | 1/2001 | Merrill | |
| 6,393,560 B1 | 5/2002 | Merrill et al. | |
| 2001/0039612 A1 | 11/2001 | Lee | |
| 2004/0034765 A1* | 2/2004 | James | 713/1 |
| 2005/0177710 A1 | 8/2005 | Rothman et al. | |
| 2007/0006769 A1* | 1/2007 | Dodson et al. | 102/508 |
| 2007/0112899 A1 | 5/2007 | Edwards et al. | |
| 2008/0104386 A1 | 5/2008 | Van Rooyen | |
| 2009/0210688 A1* | 8/2009 | Kohiga | 713/1 |
| 2010/0058045 A1* | 3/2010 | Borras et al. | 713/2 |
| 2010/0077090 A1 | 3/2010 | Cohen | |
| 2010/0083254 A1 | 4/2010 | Takahashi et al. | |
| 2010/0088543 A1* | 4/2010 | Kambara et al. | 714/15 |
| 2011/0191395 A1* | 8/2011 | Tumati et al. | 707/822 |
| 2012/0079221 A1* | 3/2012 | Sivasubramanian et al. | 711/162 |
| 2013/0042098 A1* | 2/2013 | Baik et al. | 713/2 |

FOREIGN PATENT DOCUMENTS

| | | |
|---|---|---|
| KR | 10-2001-0043130 | 5/2001 |
| KR | 10-2001-0053904 | 7/2001 |

* cited by examiner

*Primary Examiner* — Thomas Lee
*Assistant Examiner* — Robert Cassity
(74) *Attorney, Agent, or Firm* — NSIP Law (57) ABSTRACT

A technique for reducing a size of a snapshot boot image by adjusting a structure of the snapshot boot image based on an analysis of a computing system. In addition, according to the technique, the overriding portions of a snapshot based boot image may be loaded first in consideration of a time of use of the system, and therefore a boot time can be reduced.

19 Claims, 5 Drawing Sheets

APPARATUS AND METHOD FOR GENERATING A BOOT IMAGE THAT IS ADJUSTABLE IN SIZE BY SELECTING PROCESSES ACCORDING TO AN OPTIMIZATION LEVEL TO BE WRITTEN TO THE BOOT IMAGE

CROSS-REFERENCE TO RELATED APPLICATION(S)

This application claims the benefit under 35 U.S.C. §119 (a) of Korean Patent Application No. 10-2010-0097956, filed on Oct. 7, 2010, in the Korean Intellectual Property Office, the entire disclosure of which is incorporated herein by reference for all purposes.

BACKGROUND

1. Field

The following description relates to booting a computing device using a boot image, and more particularly, to a method of generating a boot image that is reduced in size in a computing system that executes a snapshot-based boot.

2. Description of the Related Art

Various types of embedded devices, for example, an MP3 player, a mobile phone, a portable multimedia player (PMP), and a personal digital assistant (PDA) are widely used as personal portable devices, and considered as daily necessities. To further increase the use of these devices, more attention has been placed on boot time as an important factor.

Recently, a size of an operating system (OS) of a variety of devices have increased, for example, a feature rich OS such as Linux kernel-based OS or Android OS including Linux kernel which may be applied to consumer electronic (CE) devices, for example, a smart phone, a smart TV, a digital TV, a camcorder, a netbook/notebook computer, and the like. As a result, boot time of such devices has increased in proportion.

Because of this increase in boot time, a user may experience inconvenience in waiting for a system to boot up, and in addition, the long boot time may make the user miss critical time for performing a desired task utilizing the system.

In a general booting method, it takes a substantial amount of time to sequentially load software components used for booting. To reduce such long boot time, a snapshot-based boot technique has been introduced.

The snapshot-based boot technique halts currently executing processes, stores various memory data and register values in an auxiliary memory in the form of snapshot images, and at the time of next boot-up, reads the snapshot images stored in the auxiliary memory, and restores the memory data and register values to expedite the booting process without additional kernel initialization.

However, as the number of services running during system runtime increases, a size of the snapshot image increases as well, resulting in a lengthened boot time.

SUMMARY

In one general aspect, there is provided a method of generating a boot image which is adjustable in size in a computing system to perform snapshot based boot, the method including determining optimization levels for a process and a library to be loaded upon boot based on collected computing system resource information, classifying processes into process classes based on a current life cycle state of the computing system and a dependency between a running process and a library, selecting processes corresponding to the process class to be loaded upon boot up of the computing system based on the determined optimization level for a process, collecting libraries used by the selected processes, selecting libraries used for loading the selected processes from the selected libraries based on the determined optimization level for a library, and generating a boot image including the selected process and libraries.

The method may further comprise collecting the system resource information including an average input/output throughput, a size of a main memory, and a runtime memory footprint.

The determining of the optimization levels may comprise predicting sizes of boot images, each consisting of processes and libraries to be loaded upon boot, based on combinations of determinable optimization levels, calculating a boot time with respect to each size of the boot images using the system resource information, and determining the optimization levels for a process and library which correspond to a boot image suitable to a boot time used by the computing system.

The boot time used by the computing system may be set by a user of the computing system or a manufacturer of the computing system.

The classifying of the processes into the process classes may comprise classifying processes into a process class 1 which includes processes being executed in the foreground of the is computing system, and classifying processes into a process class 2 which includes processes that do not belong to the process class 1 and that perform a task that influences a screen displayed to a user of the computing system.

The classifying of the processes into the process classes may further comprise classifying processes into a process class 3 which includes processes that perform a task and that do not belong to process class 1 or process class 2, and classifying processes into a process class 4 which includes processes that do not belong to the process classes 1, 2, and 3.

The classifying of the processes into the process classes may comprise classifying processes into a process class 1 which includes processes being executed by direct interaction with a user of the computing system and auxiliary processes communicating with a process being executed, and classifying processes into a process class 2 which includes processes that are partially displayed on the foreground, processes blocked by a message popup window, and auxiliary processes communicating with the partially displayed or blocked processes.

The collecting of the libraries may comprise collecting libraries having a dependency with respect to a running process in the computing system, and analyzing all of the collected libraries, functions, paths directly referred to by the running process among the collected libraries, and paths directly used by the running process from among the collected libraries.

The determining of the optimization levels for the process may comprise defining the optimization levels as three levels according to the system resource information, and the selecting of the processes comprises selecting all processes corresponding to the process classes 1, 2, 3, and 4 when the optimization level for a process is determined as level 0, selecting processes corresponding to the process classes 1, 2, and 3 when the optimization level for a process is determined as level 1, and selecting processes corresponding to the process classes 1 and 2 when the optimization level for a process is determined as level 2.

The determining of the optimization levels for the library may comprise defining the optimization levels as three levels according to the system resource information, and the selecting of the libraries comprises selecting all selected libraries when the optimization level for a library is determined as level 0, selecting the functions and paths which are directly referred to by the running process from among the collected libraries when the optimization level for a library is determined as level 1, and selecting the paths directly used by the running process from among the collected libraries when the optimization level for a library is determined as level 2.

In another aspect, there is provided a method for generating a snapshot boot image which is adjustable in size, the method including classifying processes that are in execution and that are to be executed by a computing device into a plurality of process classes based on a life cycle state of each process and a dependency between each process and one or more libraries of data, collecting system resource information about the computing device, determining to include information about processes from one or more of the plurality of process classes in the snapshot boot image, based on the collected system resource information, and generating a snapshot boot image comprising the information about the processes from the determined one or more process classes.

The determining may comprise determining that the information about the processes of at least one processing class are not to be included in the snapshot boot image, based on the collected system resource information.

The collected system resource information may comprise at least one of an average throughput of a boot medium of the computing device, a size of available memory of the computing device, and a runtime memory footprint of the computing device.

The method may further comprise determining the libraries which each respective process from the one or more process classes is dependent upon, determining an amount of data is of each respective library to include in the boot image based on the collected system resource information, and further generating the snapshot boot image including the determined amount of data of each respective library.

The determining may determine to include the entire data of each respective library, in the snapshot boot image.

The determining may determine to include the functions and/or routines of each respective library that are directly used by the processes of the one or more determined process classes, in the snapshot boot image.

The determining may determine to include the relevant routines of each respective library that have a dependency on the processes of the one or more determined process classes, in the snapshot boot image.

The method may further comprise booting the computing device based on the generated snapshot boot image.

Other features and aspects may be apparent from the following detailed description, the drawings, and the claims.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
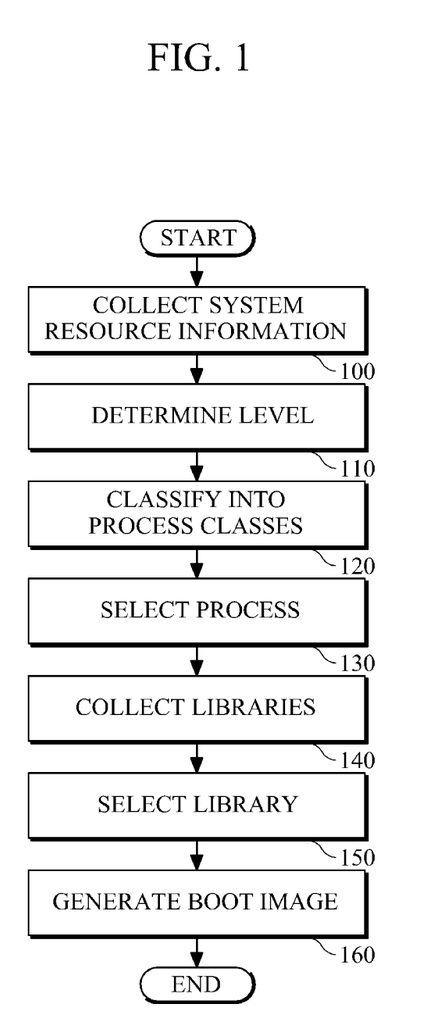
FIG. 1 is a flowchart illustrating an example of a method of generating a boot image which is adjustable in size.

FIG. 1 illustrates an example of a method of generating a boot image that is adjustable in size.

Referring to the example illustrated in FIG. 1, in 100, system resource information is collected. The system resource information may include, for example, an average input/output (I/O) throughput of a boot medium of the computing system, a size of available physical main memory, a runtime memory footprint of the whole system, and the like.

Based on the system resource information, a level for generating an improved boot image is determined, in 110. For example, the level may be determined based on a process for booting up and a library dependent on the process. An example of the level is described with reference to FIG. 2.

In 120, processes are classified into process classes based on a life cycle state of each process that is being executed or that is to be executed, and based on the accessibility by a user. A process is selected to generate a boot image according to a level determined for each process class, in 130.

A determination is made as to which libraries are dynamically connected to a process that is being executed, and a list of shared libraries that refer to the process that is being executed is collected based on the determined result, in 140. In this example, a determination may be made as to whether there is dependency between one or more libraries and the process that is being executed.

From the collected list of the libraries, in 150 a library dependent on the selected process is selected to generate a boot image based on the determined level.

In 160, a boot image is generated through a snapshot-based booting scheme using the selected process and library.

Figure 2:
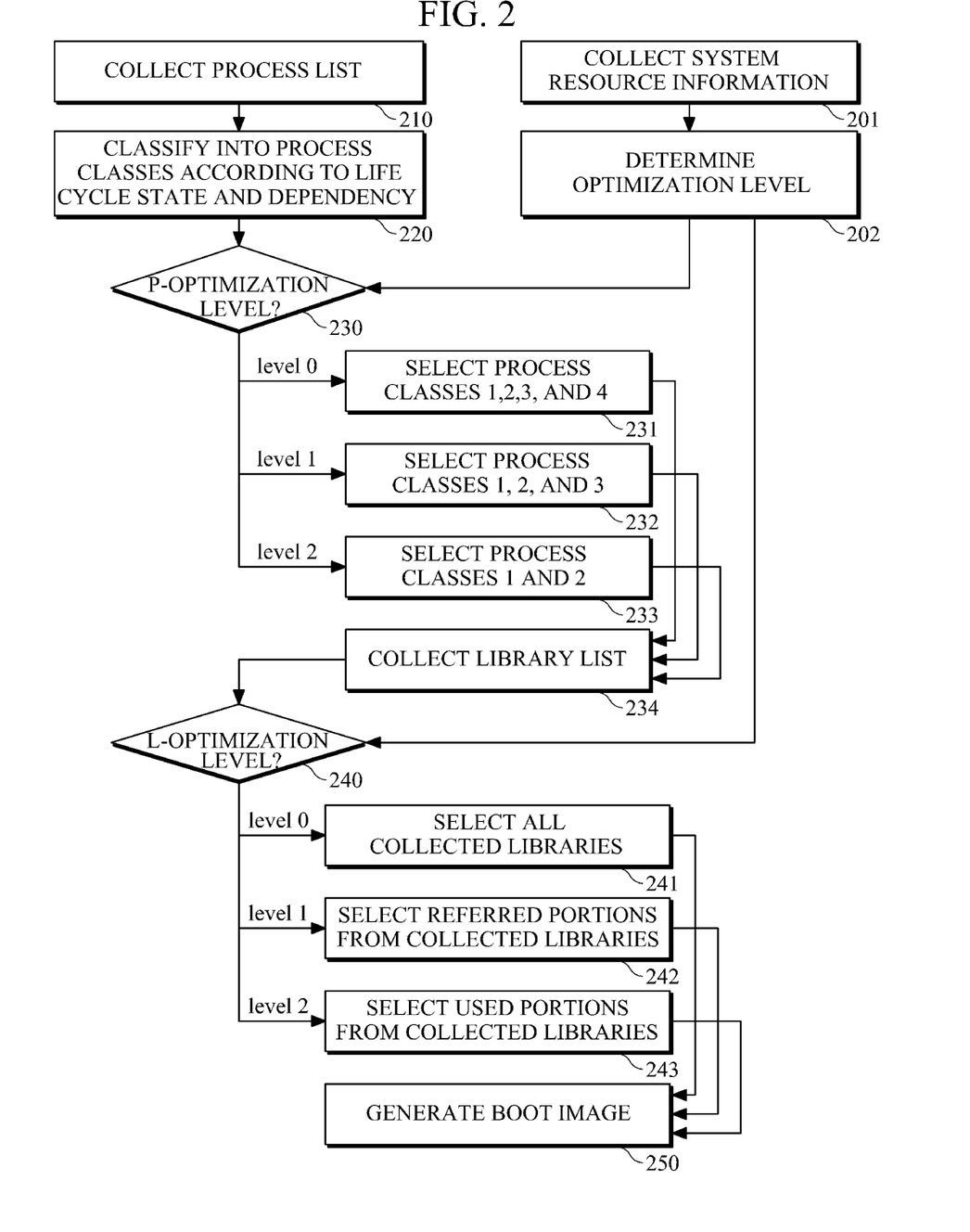
FIG. 2 is a flowchart illustrating another example of a method of generating a boot image which is adjustable in size.

FIG. 2 illustrates another example of a method of generating a boot image that is adjustable in size.

The resource information is collected in 201. The resource information may include, for example, an average input/output (I/O) throughput of a boot medium of the computing system, a size of available physical main memory, a runtime memory footprint of the whole system, and the like.

Based on the collected system resource information, in 202, a level for generating a boot image is determined from a process for booting up and a library dependent on the process. In this example, the snapshot boot image is an image that is formed of memory pages to be loaded on a main memory at the time of booting up. The snapshot boot image may be loaded on the main memory, and control may be given to the system. Additional pages thereafter are loaded to the main memory on demand, thereby enabling faster boot. The level used for selecting a is process and a library to generate a boot image for fast boot may be determined such that a boot image may be generated to reduce boot time.

In the course of performing the above operations, in 210, the computing system collects information about processes that are being executed or expected to be executed on the system and creates a list of the processes. The collected processes may be classified into process classes based on a life cycle state of each of the collected processes and dependency between processes, in 220.

For example, processes may be classified into a plurality of classes. In the example described herein, the processes are classified into four classes as follows for optimization of size of memory page according to the life cycle state of the process. However, it should be appreciated that the processes may be classified into another amount of classes. For example, the processes may be classified into two classes, three classes, four classes, or more classes.

Referring to the example herein, process class 1 includes processes that are currently executed in a foreground. If a process satisfies at least one of the conditions below, in this example, the process is determined to be included in the process class 1.

A process which directly interacts with a user, for example, on Resume callback routine invoked in Android OS.

A service/daemon process that is in communication with one of the above processes that directly interacts with a user, for example, a service entity that executes callback routine corresponding to on Create, on Start, and on Destroy, or broadcast receiver entity that executes on Receive callback routine.

Processes which are not included in process class 1 but influence outcomes on a screen that a user is viewing, and processes which satisfy one of the conditions below may be classified into a process class 2.

Process which is partly displayed while not being executed in the foreground of a screen, or which is blocked by, for example, message dialogs, or the like.

Process which provides a service bound with one of the above processes that are not being executed in the foreground or which are blocked.

Processes which do not correspond to the process class 1 or the process class 2, but which are executed as service daemon are classified into a process class 3.

For example, when a user is performing web-navigation using a browser, and playing music in the background, a music play application that is running in the background may correspond to the process class 3.

Processes which do not correspond to one of the process classes 1, 2 and 3, and which satisfy at least one of the conditions below are classified into a process class 4.

Process that has been used by a user, but is not in use at present and not yet killed or terminated.

Process that has never been used by a user, but is an empty process to shorten a startup time.

In 230, the determined level is identified, and the process classes are selected from the above classified process classes 1, 2, 3, and 4 based on the determined level (231 to 233).

An example of classifying the process classes may be as follow. In the computing system, when life cycle state of the process is changed, for example, when a process is generated, executed, or halted, a communication channel between processes is created. In this example, each time an action takes place, for example, when a message is transmitted or a callback routine is called, a determination is made as to whether process class classification criteria are changed and the process class type is set in a corresponding region of the process management data structure. Simultaneously, information about a memory footprint of each process class is continuously updated using the set process class information of each process using a module that manages memory usage in the computing system. By doing this, the states of all processes that are present in the system may be maintained up-to-date in real-time.

An example of a method of selecting a process based on the determined level may be implemented as described below.

In case of system shutdown (suspend), as described above, with reference to the memory footprint information of each process class, if the optimization level (P-optimization level) for process classes is set to a level 0, in 231, a memory footprint is determined to correspond to the process classes 1, 2, 3, and 4 in the snapshot boot image. If the P-optimization level is set to a level 1, in 232, the memory footprint is determined to correspond to the process classes 1, 2, and 3. If the P-optimization level is set to a level 2, in 233, the memory footprint is determined to correspond to the process classes 1 and 2.

In 234, a determination is made as to whether each process being executed is dynamically connected to a library. In this example, a determination is made as to whether a process has dependency to a library, and a list of shared libraries that are referred to by the process currently being executed is collected, in 234.

Because each of currently executed processes includes information on libraries that are dynamically connected to the process, dependency of the process to a shared object may be determined with reference to .dynamic section of a program is run. For example, the .dynamic section of the program may be runtime linker for a dynamic object such as ld.so.1 that is run.

Based on the above information, a list of shared libraries that are directly referred to by an object process may be obtained. In this example, the list of shared libraries is referred to as "libraries of direct dependency," and libraries which have recursive dependency may be is extracted from these libraries of direct dependency. The libraries that have recursive dependency are referred to as "libraries of indirect dependency." The information regarding the libraries may not need to be checked each time the system is run, and when the system is shut down (suspended), only the processes of the process classes to be included in the snapshot boot image may be checked.

A transfer speed of an I/O path at which image loading is executed may vary based on a device. Because a bootloader installed in a device has already recognized an I/O path to boot up the system, data transfer speed in a corresponding I/O path may be found from an appropriate size of arbitrary data, and this data transfer speed may be constant unless a boot I/O path is changed. Apart from this, a runtime memory footprint of the currently running computing system may vary with the types of applications in use by a user, and the number of applications in use.

In 240, the determined level is identified, and libraries are selected from the collected shared libraries based on the above classification criteria and the identified level (241 to 243).

Examples selecting libraries based on the selected level may be as follows.

In this example, at each of optimization levels (P-optimization) 0, 1, and 2 for process classes, processes of process classes to be included in the snapshot boot image may be checked in terms of library dependency as described above, and the libraries that have a dependency may be detected quickly.

In this example, a routine of a shared library which is used by the most recently run process immediately before a system shutdown (suspend) event may be recognized, or a routine of a shared library which has a high possibility of jumping soon may be recognized by identifying instruction branching.

In this example, if an optimization level (hereinafter, will be referred to as an "L-optimization level") for shared libraries is set to a level 0, the whole shared libraries that have dependency may be included in a snapshot boot image, in 241. If the L-optimization level is set to a level 1, functions and/or routines that are directly used by a corresponding process are selectively included in the snapshot boot image among the shared libraries having dependency, in 242. If the L-optimization level is set to a level 2, a routine of only a corresponding region is included in the snapshot boot image, in 243.

Thus, a size of snapshot boot image may be generated based on the combination of the optimization levels that are applicable at a time of system shutdown.

If the sizes of snapshot boot images are divided by the transfer speed of the I/O path to be used for loading the boot image, a boot time at each optimization level may be predicted. For example, an optimization level may be induced by comparing the predicted boot time with a boot time requirement that is previously set by a user or a manufacturer.

Based on the combination of the determined P-optimization level and the determined L-optimization level, in 250 a memory address range to be included in the snapshot boot image is determined, and the determined memory address range is enabled to be used for generating the snapshot boot image.

FIGS. 3A to 3E illustrate examples of process classes and libraries which are taken into consideration to adjust a size of a boot image. The examples illustrated in FIGS. 3A to 3E show how much a region that is to be included in a snapshot boot image can be reduced based on the combination of P-optimization level and L-optimization level.

Figure 3A:
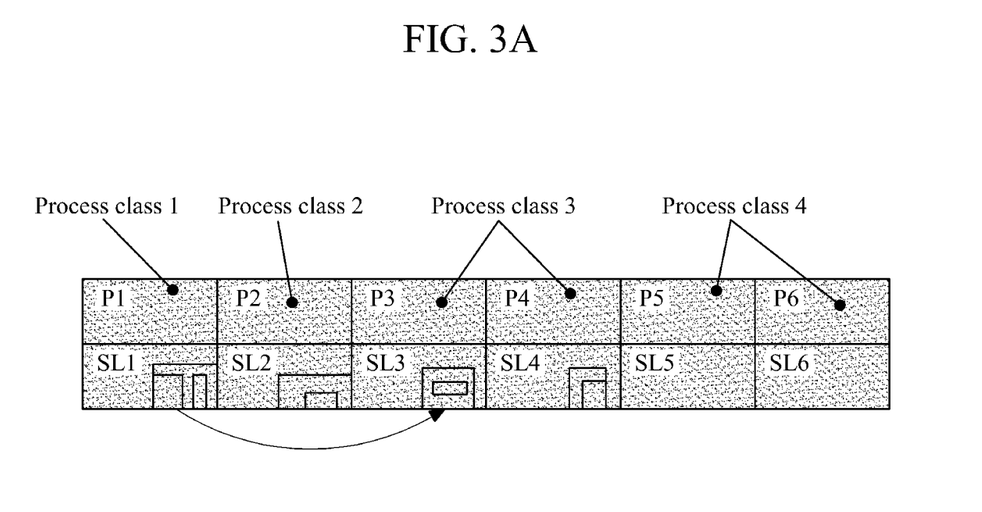
FIGS. 3A to 3E are diagrams illustrating examples of process classes and libraries which are taken into consideration when a size of a boot image is adjustable.

Referring to the example illustrated in FIG. 3A, if both a P-optimization level and an L-optimization level are set to level 0, a region of the snapshot boot image may consist of one process class 1 P1, one process class 2 P2, two process classes 3 P3 and P4, two process classes 4 P5 and P6, and may include all six libraries (SL1 to SL6) that are collected and that correspond is to the process classes 1 through 4 (P1, P2, P3, P4, P5, and P6).

Figure 3B:
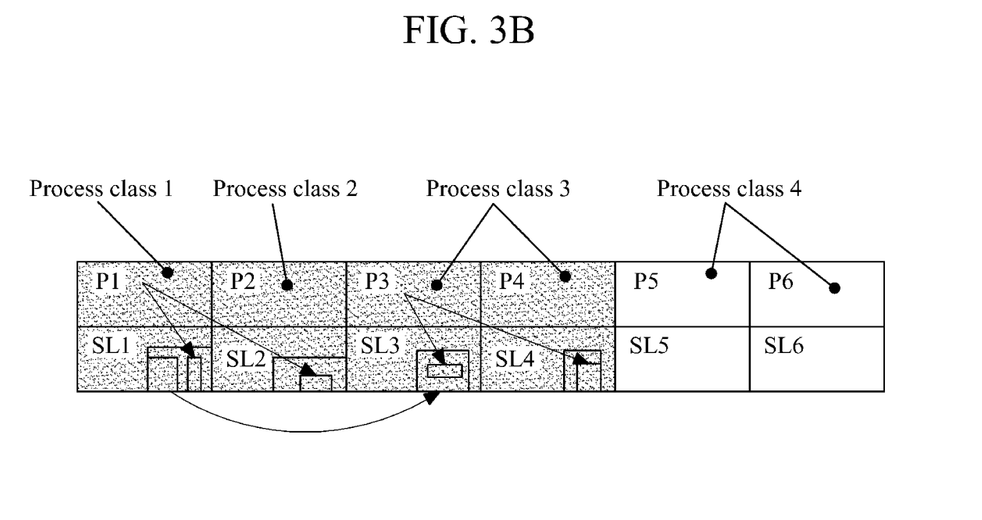

As another example, referring to the example illustrated in FIG. 3B, if the P-optimization level is set to level 1 and the L-optimization level is set to level 0, a corresponding region of the snapshot boot image may consist of one process class 1 P1, one process class 2 P2, and two process classes 3 P3 and P4, and may include four libraries (SL1 to SL4) that have a dependency with respect to the process classes 1, 2, and 3 (P1, P2, P3, and P4).

Figure 3C:
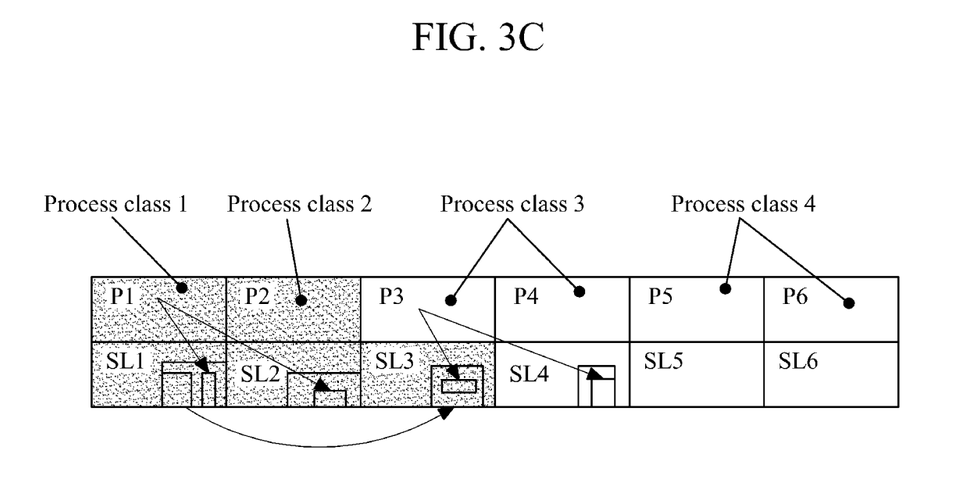

As another example, referring to the example illustrated in FIG. 3C, if the P-optimization level is set to level 2 and the L-optimization level is set to level 0, a corresponding region of the snapshot boot image may consist of one process class 1 P1 and one process class 2 P2, and may include three libraries (SL1 to SL3) that have a dependency with respect to the process classes 1 and 2 (P1 and P2).

Figure 3D:
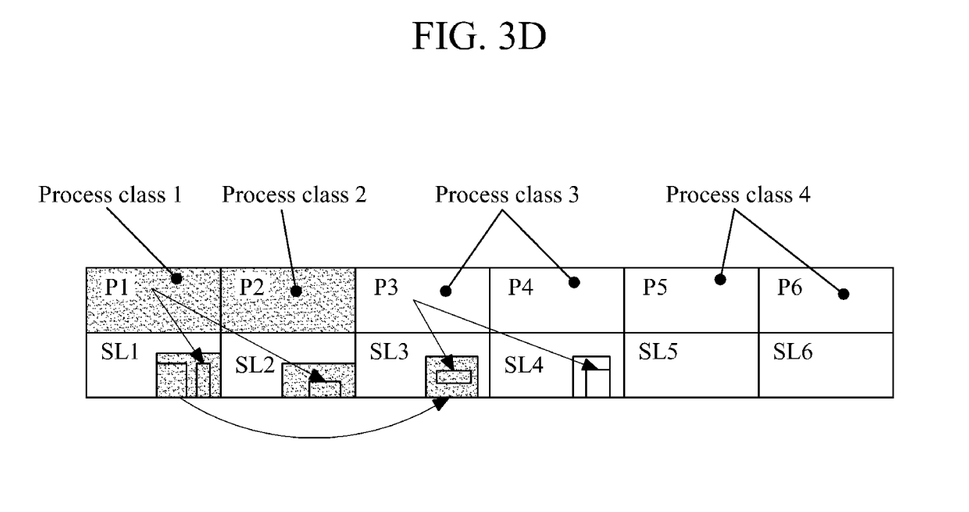

As another example, referring to the example illustrated in FIG. 3D, if the P-optimization level is set to level 2 and the L-optimization level is set to level 1, a corresponding region of the snapshot boot image may consist of one process class 1 P1 and one process class 2 P2, and functions and/or routines that are directly used by processes included in the process classes 1 and 2 (P1 and P2) may be selectively obtained from libraries that have a dependency with respect to the process classes 1 and 2 (P1 and P2) and may be included in the snapshot boot image.

Figure 3E:
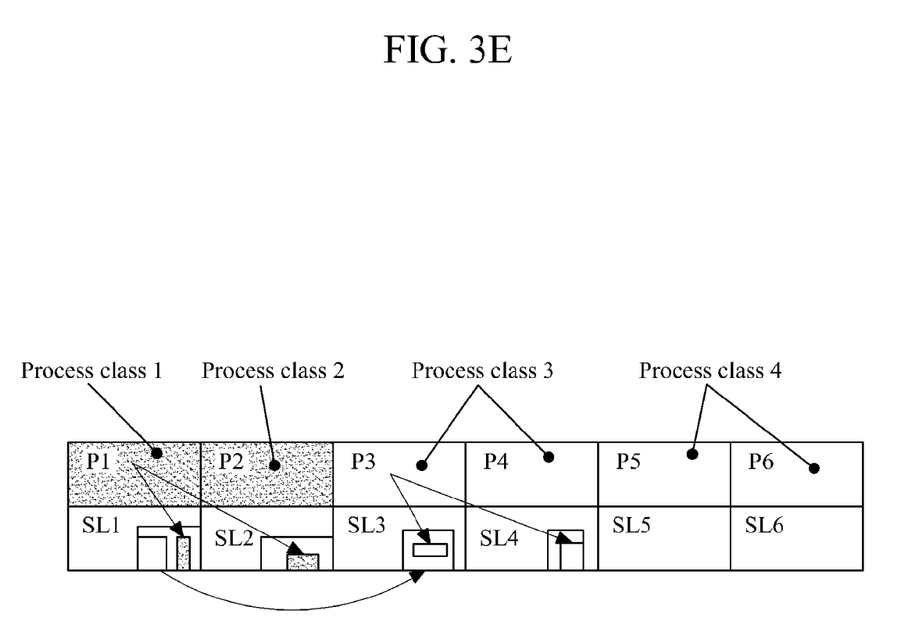

As another example, referring to the example illustrated in FIG. 3E, if the P-optimization level is set to level 2 and the L-optimization level is set to level 2, a corresponding region of the snapshot boot image may consist of one process class 1 (P1) and one process class 2 (P2), and only relevant routines may be selected from libraries that have a dependency with respect to the process classes 1 and 2 (P1 and P2) and may be used for the snapshot boot image.

As described above, a region to be included in the snapshot boot image for boot up may is be reduced as the P-optimization level and the L-optimization level are changed. Thus, a computing system can be implemented which reduces a size of a snapshot boot image and reduces a boot time.

According to the examples described above, image size optimization may reduce the size of a snapshot boot image to be loaded on a memory upon boot As a result fast boot can be realized even when there is an increase in size of software stack and feature rich OS such as Linux kernel based OS or Android OS including Linux kernel, which is mounted in a device, for example a smart phone, a smart TV, a camcorder, and a net-book/notebook computer.

For example, for larger size images to be loaded on a system memory, portions of the images to be loaded first on the memory may be determined in consideration of the time of use of the system and the determined portions may be loaded to reduce the boot time.

In addition, by applying the method described above, a linear increase of a boot time with a size of software installed in a system may be moderated.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A snapshot based boot method of generating a size-adjustable boot image in a computing system, the method comprising:
   determining optimization levels for a process and a library to be loaded upon boot based on collected computing system resource information;

classifying processes into process classes based on a current life cycle state of the computing system and a dependency between a running process and a library;
selecting processes corresponding to the process class to be loaded upon boot up of the computing system based on the determined optimization level for a process;
collecting libraries used by the selected processes;
selecting libraries used for loading the selected processes from the selected libraries based on the determined optimization level for a library;
generating a snapshot boot image including the selected process and libraries; and
adjusting the size of the snapshot boot image by changing the process and library optimization levels.

2. The method of claim 1, further comprising:
collecting the system resource information including an average input/output throughput, a size of a main memory, and a runtime memory footprint.

3. The method of claim 1, wherein the determining of the optimization levels comprise predicting sizes of boot images, each consisting of processes and libraries to be loaded upon boot, based on combinations of determinable optimization levels, calculating a boot time with respect to each size of the boot images using the system resource information, and determining the optimization levels for a process and library which correspond to a boot image suitable to a boot time used by the computing system.

4. The method of claim 3, wherein the boot time is a set time.

5. The method of claim 1, wherein the classifying of the processes into the process classes comprises classifying processes into a process class 1 which includes processes being executed in the foreground of the computing system, and classifying processes into a process class 2 which includes processes that do not belong to the process class 1.

6. The method of claim 5, wherein the classifying of the processes into the process classes further comprises classifying processes into a process class 3 which includes processes that perform a task and that do not belong to process class 1 or process class 2, and classifying processes into a process class 4 which includes processes that do not belong to the process classes 1, 2, and 3.

7. The method of claim 1, wherein the classifying of the processes into the process classes comprises classifying processes into a process class 1 which includes processes being executed by direct interaction with the computing system and auxiliary processes communicating with a process being executed, and classifying processes into a process class 2 which includes processes that are partially displayed on the foreground, processes blocked by a message popup window, and auxiliary processes communicating with the partially displayed or blocked processes.

8. The method of claim 1, wherein the collecting of the libraries comprises collecting libraries having a dependency with respect to a running process in the computing system, and analyzing all of the collected libraries, functions, paths directly referred to by the running process among the collected libraries, and paths directly used by the running process from among the collected libraries.

9. The method of claim 6, wherein the determining of the optimization levels for the process comprises defining the optimization levels as three levels according to the system resource information, and the selecting of the processes comprises selecting all processes corresponding to the process classes 1, 2, 3, and 4 when the optimization level for a process is determined as level 0, selecting processes corresponding to the process classes 1, 2, and 3 when the optimization level for a process is determined as level 1, and selecting processes corresponding to the process classes 1 and 2 when the optimization level for a process is determined as level 2.

10. The method of claim 8, wherein the determining of the optimization levels for the library comprises defining the optimization levels as three levels according to the system resource information, and the selecting of the libraries comprises selecting all selected libraries when the optimization level for a library is determined as level 0, selecting the functions and paths which are directly referred to by the running process from among the collected libraries when the optimization level for a library is determined as level 1, and selecting the paths directly used by the running process from among the collected libraries when the optimization level for a library is determined as level 2.

11. A method for generating a size-adjustable snapshot boot image, the method comprising:
classifying processes that are in execution and that are to be executed by a computing device into process classes based on a life cycle state of each process and a dependency between each process and one or more libraries of data;
collecting system resource information about the computing device;
determining to include information about processes from one or more of the process classes in the snapshot boot image, based on the collected system resource information;
generating a snapshot boot image comprising the information about the processes from the determined one or more process classes; and
adjusting the size of the snapshot boot image by changing process and library optimization levels.

12. The method of claim 11, wherein the determining comprises determining that the information about the processes of at least one processing class are not to be included in the snapshot boot image, based on the collected system resource information.

13. The method of claim 11, wherein the collected system resource information comprises at least one of an average throughput of a boot medium of the computing device, a size of available memory of the computing device, and a runtime memory footprint of the computing device.

14. The method of claim 11, further comprising determining the libraries which each respective process from the one or more process classes is dependent upon, determining an amount of data of each respective library to include in the boot image based on the collected system resource information, and further generating the snapshot boot image including the determined amount of data of each respective library.

15. The method of claim 14, wherein the determining determines to include the entire data of each respective library, in the snapshot boot image.

16. The method of claim 14, wherein the determining determines to include the functions and/or routines of each respective library that are directly used by the processes of the one or more determined process classes, in the snapshot boot image.

17. The method of claim 14, wherein the determining determines to include the relevant routines of each respective library that have a dependency on the processes of the one or more determined process classes, in the snapshot boot image.

18. The method of claim 11, further comprising booting the computing device based on the generated snapshot boot image.

19. A snapshot based boot method of generating a size-adjustable boot image in a computing system, the method comprising:

determining optimization levels for a process and a library to be loaded upon boot based on collected computing system resource information;

classifying processes into process classes based on a current life cycle state of the computing system and a dependency between a running process and a library;

selecting processes corresponding to the process class to be loaded upon boot up of the computing system based on the determined optimization level for a process;

collecting libraries used by the selected processes;

selecting libraries used for loading the selected processes from the selected libraries based on the determined optimization level for a library; and     generating a snapshot boot image including the selected process and libraries wherein the classifying of the processes into the process classes comprises classifying processes into a process class 1 which includes processes being executed by direct interaction with the computing system and auxiliary processes communicating with a process being executed, and classifying processes into a process class 2 which includes processes that are partially displayed on the foreground, processes blocked by a message popup window, and auxiliary processes communicating with the partially displayed or blocked processes.

\* \* \* \* \*